US007415872B2

(12) United States Patent
DeGeorge et al.

(10) Patent No.: US 7,415,872 B2
(45) Date of Patent: Aug. 26, 2008

(54) METHOD AND CODE FOR DETERMINING CHARACTERISTIC OF ROAD SURFACE BENEATH MOVING VEHICLE

(75) Inventors: John W. DeGeorge, Michigan Center, MI (US); Gary K. Lowe, Troy, MI (US)

(73) Assignee: Chrysler LLC, Auburn Hills, MI (US)

( * ) Notice: Subject to any disclaimer, the term of this patent is extended or adjusted under 35 U.S.C. 154(b) by 0 days.

(21) Appl. No.: 11/539,711

(22) Filed: Oct. 9, 2006

(65) Prior Publication Data
US 2008/0110249 A1    May 15, 2008

(51) Int. Cl.
*G01M 17/02* (2006.01)
*G06F 7/00* (2006.01)

(52) U.S. Cl. .......................................... 73/146; 701/87

(58) Field of Classification Search .................. 73/146; 701/80, 87
See application file for complete search history.

(56) References Cited

U.S. PATENT DOCUMENTS

| 4,947,332 | A |   | 8/1990  | Ghoneim |
| 5,325,300 | A |   | 6/1994  | Tsuyama et al. |
| 5,406,486 | A |   | 4/1995  | Kamio et al. |
| 5,944,392 | A |   | 8/1999  | Tachihata et al. |
| 5,947,865 | A | * | 9/1999  | Watanabe et al. ............ 477/169 |
| 6,169,949 | B1 | * | 1/2001 | Sato ............................. 701/51 |
| 6,216,081 | B1 | * | 4/2001 | Tabata et al. .................. 701/87 |
| 6,324,461 | B1 |   | 11/2001 | Yamaguchi et al. |
| 6,418,369 | B2 |   | 7/2002  | Matsumoto et al. |
| 6,510,374 | B1 |   | 1/2003  | Saotome et al. |
| 6,597,980 | B2 |   | 7/2003  | Kogure |
| 6,704,635 | B2 |   | 3/2004  | Walenty et al. |
| 6,843,752 | B2 |   | 1/2005  | Bolander |

OTHER PUBLICATIONS

"Slip-Based Tire-Road Friction Estimation*" Fredrik Gustafsson, Department of Electrical Engineering, Linkoping University Linkopingk, Sweden, Nov. 28, 1996, pp. 1-29.

* cited by examiner

*Primary Examiner*—Andre J Allen
(74) *Attorney, Agent, or Firm*—Ralph E. Smith

(57) ABSTRACT

In a method for characterizing a road surface beneath a moving vehicle whose powertrain includes a torque converter coupling the engine to a driven wheel, a set of successive values for the torque converter's slip error rate is generated using filtered values for engine speed and torque converter turbine speed. The road surface characteristic is identified based on the set of slip error rate values, as through a comparison of the set with a plurality of case statements, wherein each case statement corresponds with a different road characteristic and/or general surface type. Weighted average values are calculated based on subsets of the values within the set, for use in identifying transitions from one type of surface to another, or one surface characteristic to another. Indicated slip error rates generated in response to changes in an engine torque demand request are also identified to avoid a false indication.

19 Claims, 2 Drawing Sheets

METHOD AND CODE FOR DETERMINING CHARACTERISTIC OF ROAD SURFACE BENEATH MOVING VEHICLE

FIELD OF THE INVENTION

The invention relates generally to a method and related computer-executable code for determining a characteristic of a road surface beneath a moving vehicle, such as an automobile.

BACKGROUND OF THE INVENTION

It is often desirable to be able to ascertain a characteristic of a road surface that is beneath a moving vehicle, for example, whether the road surface is smooth or rough, pavement or gravel/sand, and hard-packed or loose-packed, and whether the vehicle is encountering a surface irregularity such as a pothole, broken pavement, or a railroad crossing, in order to modify certain vehicle operating parameters including, by way of example only, a target vehicle acceleration rate, a preferred automatic transmission gear selection and shift timing, and a projected/target braking (vehicle deceleration) rates.

Typically, a plurality of wheel speed sensors, often associated with the vehicle's antilock braking system (ABS), are employed to detect wheel slip at a driven wheel in response to the application of a braking torque to that wheel, as when actuating the wheel's associated brakes in either a vehicle braking mode or a traction control (controlled vehicle-accelerating applied wheel torque with simultaneous wheel braking) mode, and comparing the resulting change in detected wheel speed to the detected speed of other of the vehicle's wheels. However, in addition to likely requiring additional hardware in the form of wheel speed sensors at all four corners of the vehicle, such methods are necessarily limited to obtaining road surface characteristics during braking and traction-control events and, hence, do not provide any road surface information at any other time, as when the vehicle is otherwise operating at a relatively-steady speed or accelerating without engaging the traction control mode.

SUMMARY OF THE INVENTION

Under the invention, a method and associated computer-executable code are provided for characterizing a road surface encountered by a driven wheel of a vehicle, wherein the vehicle includes a torque converter providing a fluid couple between an input shaft driven by an engine and an output shaft coupled to the driven wheel. In accordance with an aspect of the invention, the method includes determining a first measure based on a first value representative of a current rotational speed of the input shaft and a second value representative of a current rotational speed of output shaft (which may be nominally representative of a current slip error of the torque converter, perhaps when the first measure is further based on a value for a commanded torque converter slip request); and determining a second measure based on successive values for the first measure, the second measure being representative of a rate of change of the first measure over time. The method further includes generating a set of successive values for the second measure; and identifying the characteristic of the road surface, for example, an estimated range for the road surface's coefficient of friction, based on the set.

In accordance with an aspect of the invention, in a preferred embodiment, the step of identifying the characteristic of the road surface includes comparing the set of values for the second measure to a plurality of case statements, wherein each case statement corresponds with a respective one of a plurality of different road characteristics and/or general surface "types," such as a "rough" surface such as a pothole or railroad crossing, a relatively-low coefficient of friction surface such as a gravel road or "washboard" surface, or a relatively-high coefficient of friction surface such as a smooth paved road surface. While the invention contemplates any suitable case statement definitions, or other suitable basis upon which to analyze the values of a given set of values for the second measure by which to identify a road surface characteristic, in a preferred embodiment, individual case statements are generally defined in terms of the "amplitude" and "duration" of the signal pulses defined by a given generated set of values for the second measure. Thus, it will be appreciated that the step of identifying may preferably include comparing at least one of the magnitude and sign of successive values within the set.

In accordance with another aspect of the invention, in the preferred embodiment, the step of identifying further includes calculating at least one weighted average value based on a subset of the successive values for the second measure within the set, for example, by calculating a first weighted average value based on the "oldest" values for the second measure to a second weighted average value based on the "most recent" values for the second measure, as a way of identifying transitions from one type of surface to another, or one surface characteristic to another.

In accordance with yet another aspect of the invention, in an embodiment wherein the engine generates an output in response to a torque demand request, the step of identifying the characteristic of the road surface further includes comparing the torque demand request to a threshold value. In this manner, indicated slip error rates that are generated in response to changes in the rotational speed of the input shaft due, for example, to an increase in the torque demand request above the threshold value will not be mistaken for an increased slip error rate representative of encountering a railroad crossing or pothole.

Other objects, features, and advantages of the present invention will be readily appreciated upon a review of the subsequent description of the preferred embodiment and the appended claims, taken in conjunction with the accompanying Drawings.

DETAILED DESCRIPTION OF THE INVENTION

Figures 1, 2:
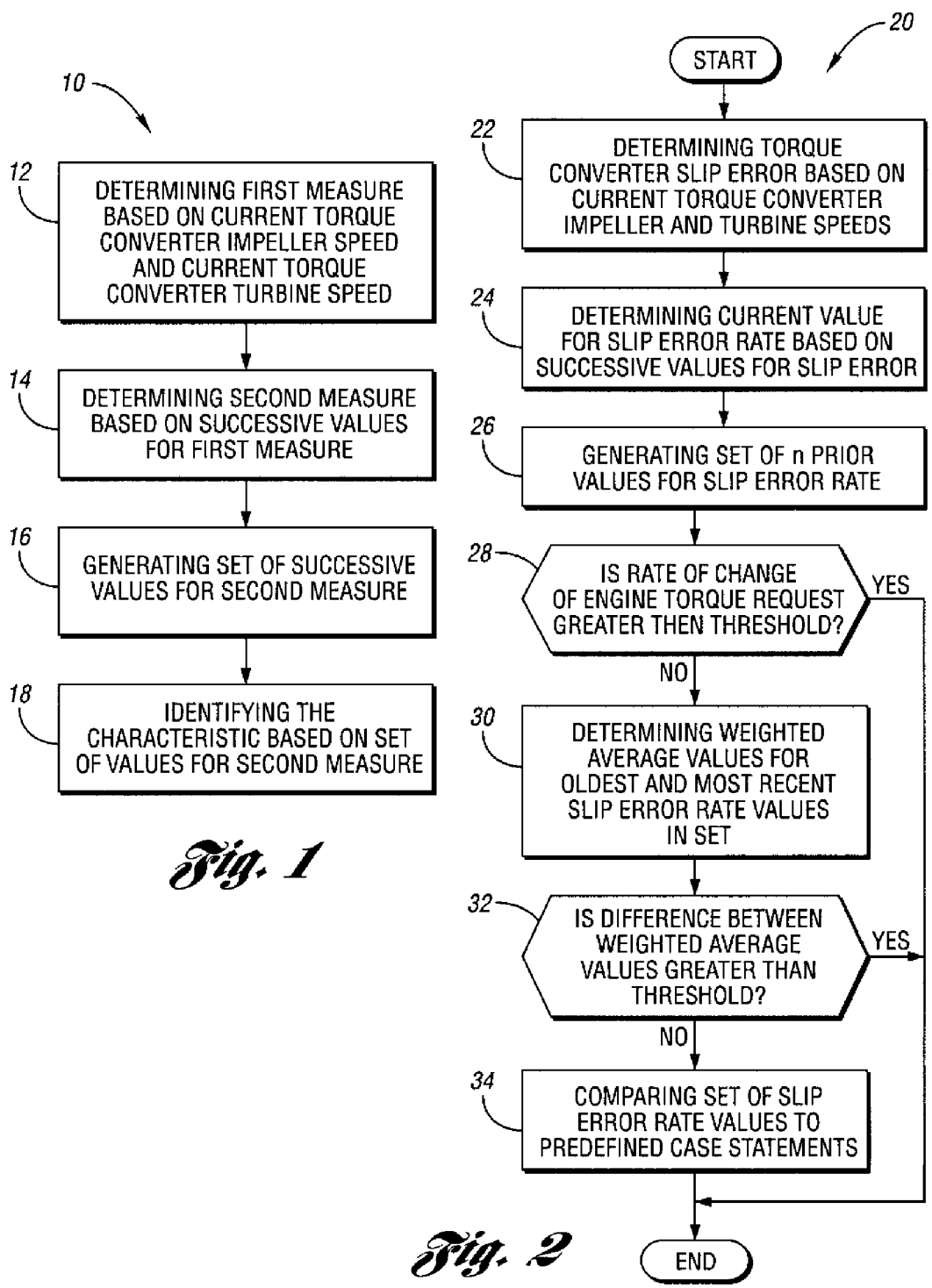
FIG. 1 is a flow chart illustrating the main steps of a method in accordance with the invention for determining a characteristic of the road surface beneath a moving vehicle.
FIG. 2 is a flow chart illustrating the steps of an exemplary method for determining a characteristic of the road surface beneath a moving vehicle.

Referring to FIG. 1, the main steps of a method 10 in accordance with the invention, for characterizing a road surface over which a vehicle having a powertrain incorporating a torque converter is moving, includes determining, at step 12, a first measure based on a first value representative of a current rotational speed of the input shaft and a second value representative of a current rotational speed of output shaft.

The method 10 further includes determining, at step 14, a second measure based on successive values for the first measure, whereby the second measure is representative of a rate of change of the first measure over time. The method 10 further includes generating, at step 16, a set of successive values for the second measure; and identifying, at step 18, the characteristic of the road surface, for example, an estimated range for the road surface's coefficient of friction, based on the set of successive values for the second measure.

Referring to FIG. 2, an exemplary method for characterizing a road surface over which the vehicle is being driven, for use with a vehicle whose powertrain includes an engine having an output shaft coupled to the input shaft (and impeller) of a torque converter, and a driven wheel coupled to the output shaft (and turbine) of the torque converter, for example, via a geartrain, propshaft, differential, and half shaft. As seen in FIG. 2, the exemplary method 20 includes determining, at step 22, a torque converter slip error based on the speed of the torque converter's input shaft/impeller and the speed of the torque converter's output shaft/turbine; and then determining, at step 24, a current value for the torque converter slip error rate based on successive previously-determined values for the slip error.

In the context of the exemplary method 20, the slip error of a torque converter is determined as the difference between a torque converters impeller speed and its turbine speed, less any commanded torque converter slip. A slip error rate is determined as the change in a pair of successive values for the slip error, over a predetermined time period. It will be appreciated that values representative of the respective speeds of the torque converter's input shaft/impeller and output shaft/turbine used in the exemplary method 20 to determine the first measure are preferably filtered to avoid turbine noise.

Referring again to FIG. 2, the exemplary method 20 also includes generating, at step 26, a set of n prior values for the torque converter's slip error rate. If it is determined, at step 28, that the rate of change of an engine torque request is greater than a predetermined threshold, the set of slip rate error values will be deemed less reliable for purposes of identifying the characteristic of the road surface, because the indicated slip error rate may simply correspond to the changing torque input to the torque converter impeller rather than the effects of a changing road surface characteristic on the speed of the torque converter's turbine.

If it is determined, at step 28, that the rate of change of an engine torque request is not greater than a predetermined threshold, the exemplary method 20 further includes determining a weighted average value for the "oldest" slip error rate values and for the most recent slip error rate values within the set. Then, at step 32, if it is determined that the difference between the weighted average values from the given set of slip error rate values is greater than a predetermined threshold, the set of slip error rate values will again be deemed less reliable for purposes of identifying the road surface characteristic, inasmuch as the vehicle's driven wheel may be transitioning, for example, from a first type of road surface to a second type of road surface.

However, if it is determined, at step 32, that the difference between the weighted average values from the given set of slip error rate values is not greater than the predetermined threshold, the exemplary method 20 includes comparing the values within the set of slip error rate values to a plurality of predefined case statements, to thereby characterize the road surface over which the vehicle is moving.

While the invention contemplates the use of any suitable case statement definitions, or any other suitable basis upon which to analyze the values of a given set of values for the second measure by which to identify a road surface characteristic, in the exemplary method 20, individual case statements are generally defined in terms of the "amplitude" and "duration" of the signal pulses defined by a given generated set of values for the second measure. Thus, it will be appreciated that the step of identifying may preferably include comparing at least one of the magnitude and sign of successive values within the set.

Figure 3:
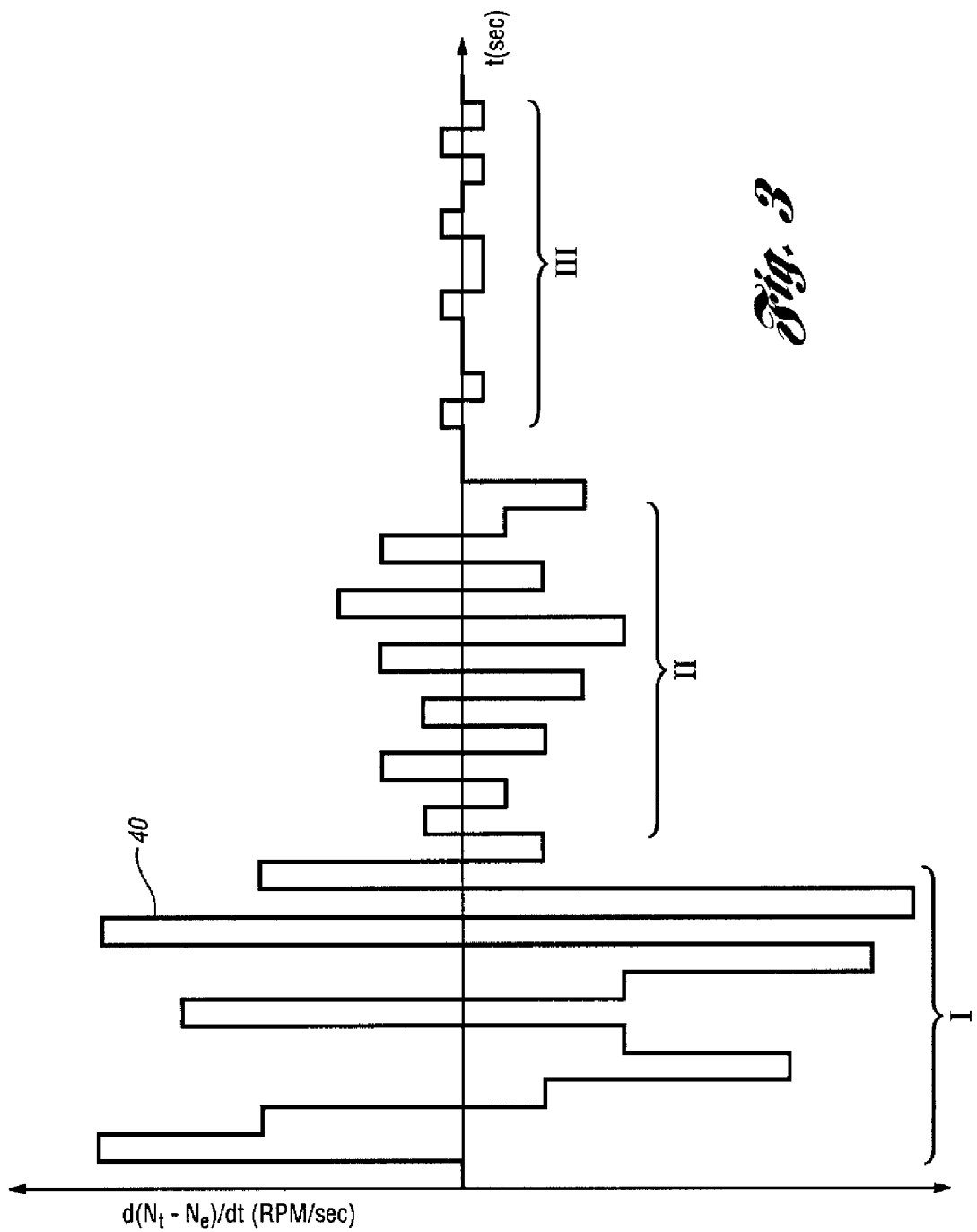
FIG. 3 is a plot of a calculated measure versus time, showing the vehicle as it encounters several different types of road surfaces that may be readily identified using the exemplary method of FIG. 2.

By way of further example only, FIG. 3 shows a plot 40 showing successive determined values for the torque converter slip error rate over time. A first set (generally indicated as set "I" in FIG. 3) of successive values for the slip error rate featuring relatively high "peaks" and a relatively greater "duration" is generally characteristic of the slip error rate response when the vehicle's driven wheel encounters a pothole or a railroad crossing. A second set (generally indicated as set "II" in FIG. 3) of successive values for the slip error rate featuring relatively moderate "peaks" and a relatively shorter "duration" is generally characteristic of the slip error rate response when the vehicle's driven wheel encounters a gravel road or "washboard" surface. And a third set (generally indicated as set "III" in FIG. 3) of successive values for the slip error rate featuring relatively small "peaks" and a relatively greater period is generally characteristic of the slip error rate response when the vehicle's driven wheel encounters a smooth paved surface.

From the foregoing, it will be appreciated that the exemplary method 20 is not affected by road gradients and, further, can advantageously be performed during a generally-steady-state driving condition without having to apply the vehicle brakes, as is typical of known approaches for detecting a characteristic of a road surface. The exemplary method 20 can also advantageously be used, for example, when the vehicle is moving down a slope while "braking" on the engine, provided that the engine speed does not vary excessively when generating the set of slip error rate values to be used in identifying a characteristic of the road surface.

While the above description constitutes the preferred embodiment, it will be appreciated that the invention is susceptible to modification, variation and change without departing from the proper scope and fair meaning of the subjoined claims.

What is claimed is:

1. A method for characterizing a road surface encountered by a driven wheel of a vehicle, wherein the vehicle includes a torque converter providing a fluid couple between an input shaft driven by an engine and an output shaft coupled to the driven wheel, the method comprising:
    determining a first measure based on a first value representative of a current rotational speed of the input shaft and a second value representative of a current rotational speed of the output shaft;
    determining a second measure based on successive values for the first measure, the second measure being representative of a rate of change of the first measure over time;
    generating a set of successive values for the second measure; and
    identifying the characteristic based on the set.

2. The method of claim 1, wherein determining the first measure includes calculating a difference between the first value and the second value.

3. The method of claim 1, wherein the torque converter is responsive to a third value representative of a commanded slip request, and wherein determining the first measure is further based on the third value, whereby the first measure is representative of a torque converter slip error.

4. The method of claim 1, wherein identifying includes comparing the set to a plurality of case statements, wherein each case statement corresponds with a respective one of a plurality of different road characteristics.

5. The method of claim 1, wherein identifying includes comparing a magnitude and sign of one value for the second measure within the set with a magnitude and sign of another value for the second measure within the set.

6. The method of claim 1, wherein identifying further includes calculating a weighted average value based on a subset of the successive values for the second measure within the set.

7. The method of claim 1, wherein the engine generates an output in response to a torque demand request, and wherein identifying further includes comparing the torque demand request to a threshold value.

8. A method for determining a characteristic of a road surface beneath moving vehicle, wherein the vehicle is propelled by a powertrain that includes an engine responsive to a demand signal, and a torque converter having an impeller coupled to the engine and a turbine coupled to a driven wheel, the method comprising:

determining a measure based on a pair of first values representative of a current and a prior rotational speed of the torque converter impeller, and on a pair of second values representative of a prior and a current rotational speed of the torque converter turbine;

generating a set of a plurality of values for the measure; and identifying the characteristic based on the set.

9. The method of claim 8, wherein the measure is representative of a current torque converter slip error rate.

10. The method of claim 8, wherein the plurality of values for the measure in the set are successive values for the measure that include a current value for the measure.

11. The method of claim 10, wherein identifying further includes calculating a weighted average value based on a subset of the successive values for the measure within the set.

12. The method of claim 10, wherein identifying includes comparing the set to a plurality of case statements, wherein each case statement corresponds with a respective one of a plurality of different road characteristics.

13. The method of claim 10, wherein identifying includes comparing a magnitude and sign of one value for the measure within the set with a magnitude and sign of another value for the measure within the set.

14. The method of claim 8, wherein engine is responsive to a torque demand request, and further including comparing the torque demand request to a threshold value.

15. A computer-readable storage medium including computer-executable code for characterizing a road surface encountered by a driven wheel of a vehicle, wherein the vehicle includes a torque converter providing a fluid couple between an input shaft driven by an engine and an output shaft coupled to the driven wheel, the engine generating an output responsive to a torque demand request, the storage medium including:

code for determining a first measure based on a first value representative of a current rotational speed of the input shaft and a second value representative of a current rotational speed of the output shaft;

code for determining a second measure based on successive values for the first measure, the second measure being representative of a rate of change of the first measure over time;

code for generating a set of successive values for the second measure; and code for identifying the characteristic based on the set.

16. The storage medium of claim 15, wherein the code for identifying includes code for comparing the set to a plurality of case statements, wherein each case statement corresponds with a respective one of a plurality of different road characteristics.

17. The storage medium of claim 15, wherein the code for identifying includes code for comparing a magnitude and sign of one value for the second measure within the set with a magnitude and sign of another value for the second measure within the set.

18. The storage medium of claim 15, wherein the code for identifying further includes code for calculating a weighted average value based on a subset of the successive values for the second measure within the set.

19. The storage medium of claim 15, wherein the code for identifying further includes code for comparing the torque demand request to a threshold value.

* * * * *